United States Patent [19]

Ooyama et al.

[11] Patent Number: 4,942,324
[45] Date of Patent: Jul. 17, 1990

[54] ROTOR FOR ROTARY ELECTRIC MACHINE

[75] Inventors: Yuji Ooyama; Toshinari Shimazu, both of Kobe, Japan

[73] Assignee: Mitsubishi Denki Kabushiki Kaisha, Japan

[21] Appl. No.: 292,941

[22] Filed: Jan. 3, 1989

[30] Foreign Application Priority Data

May 30, 1988 [JP] Japan .................. 63-130432

[51] Int. Cl.[5] .......... H02K 1/00; H02K 1/28; H02K 1/22
[52] U.S. Cl. .................. 310/216; 310/218; 310/261; 310/267
[58] Field of Search ............. 310/217, 218, 216, 261, 310/264, 265, 267, 269

[56] References Cited

U.S. PATENT DOCUMENTS

| 427,405 | 5/1890 | Deprez | 310/267 |
| 505,926 | 10/1893 | Schmid | 310/269 |
| 2,655,613 | 10/1953 | Wieseman | 310/218 |
| 3,849,683 | 11/1974 | Leistner | 310/218 |
| 4,354,126 | 10/1982 | Yates | 310/217 |
| 4,489,249 | 12/1984 | Olivier | 310/216 |
| 4,801,834 | 1/1989 | Stokes | 310/261 |

FOREIGN PATENT DOCUMENTS 1161637  1/1964  Fed. Rep. of Germany ...... 310/218

Primary Examiner—Peter S. Wong
Assistant Examiner—C. E. LaBalle
Attorney, Agent, or Firm—Leydig, Voit & Mayer

[57] ABSTRACT

A rotor for a rotary electric machine having a plurality of split sectors each composed of a laminated of split sector pieces made of sector-shaped thin steel plates, arranged in one circular shape, coupled to a rotor clamping tool by the joint of the lower end of the sectors, and rotor coils inserted into the coil slots of the split sectors and connected to each other outside the split sectors.

5 Claims, 5 Drawing Sheets

ROTOR FOR ROTARY ELECTRIC MACHINE

BACKGROUND OF THE INVENTION

The present invention relates to a rotor for a rotary electric machine.

A structure of a conventional rotor core of a wound rotor having a rotor coil for a rotary electric machine is constructed by punching a silicon steel plate in a disc shape and laminating the disc-shaped plates.

However, since the punching die used to punch the steel plate is large in size in the case of a large-sized rotary electric machine, a rotor core is constructed, due to the above mentioned restriction in the manufacture of the rotor core, for example, as shown in FIG. 4, by punching a silicon steel plate in a sector shape, then arranging sector-shaped steel plates in a circle as shown in FIGS. 6(A) and 6(B), and laminating them.

In FIGS. 4, 5, 6(A) and 6(B), reference numeral 1 denotes a rotor core, symbol 1a denotes rotor core pieces made of a punched silicon steel plate, numeral 2 denotes slots to which a rotor coil is inserted, numeral 3 denotes a clamping bolt hole through which a clamping bolt is penetrated, numeral 4 denotes keyways for coupling the rotor core 1, for example, to a spider boss, numeral 5 denotes a ventilation duct for ventilating to cool the rotor, numeral 6 denotes a rotor coil, numeral 7 denotes a retainer for clamping the rotor core to integrate them by clamping the rotor core pieces 1a, numeral 8 denotes a ventilation fan for blowing cooling air to the stator, numeral 9 denotes a spider boss, and numeral 10 denotes a rotational shaft. The slots 2 are shown only in FIG. 4 for the simplification of the illustration.

Then, a method of manufacturing the conventional rotor will be described.

The rotor core 1 having a large diameter is generally formed by punching a thin silicon steel plate in a sector shape as shown in FIG. 4 to form rotor core pieces 1a. Then, the rotor core pieces 1a are stacked in a cylindrical shape while providing the ventilation duct 5 as shown in the sectional view of FIG. 5. In other words, a plurality of the rotor core pieces 1a are disposed horizontally to form one circular shape, and then the layers each formed of the one circular-shaped thin plates made of the rotor core pieces 1a are sequentially stacked upward similarly to the above. In the case of FIG. 4, 10 sheets of the core pieces 1a are disposed horizontally in one circular shape as one layer, and the layers thus formed are sequentially stacked upward. As described above, the rotor core pieces 1a thus stacked are clamped by penetrating the clamping bolts through the clamping bolt holes 3, and the rotor core 1 is constructed by providing the retainers 7 for clamping the rotor core at the upper and lower ends of the rotor core pieces 1a thus stacked, penetrating the clamping bolts therethrough, and clamping them with the clamping bolts in the axial direction.

The slots 2 for inserting the rotor coil 6 are formed at the outer periphery of the rotor core 1. After the rotor core 1 is constructed, the rotor coil 6 is inserted into the slots 2, and fixed in the slots 2 by inserting wedges to the outer peripheral ends of the slots 2.

A torque is transmitted between the spider boss 9 and the rotor core 1 through keys inserted into the keyways 4.

As described above, the rotor core pieces 1a are arranged horizontally in one circular shape, and the layers of the circular-shaped thin plates made of the rotor core pieces 1a are sequentially stacked. FIGS. 6(A) and 6(B) show the case where the rotor core pieces 1a are lap stacked at each ¼ of one circle. More specifically, the rotor core pieces 1a shown in FIG. 4 are aligned in one circular shape on the outer periphery of the spider boss 9. In the case of the rotor core piece shown in FIG. 4, when ten sheets of the rotor core pieces 1a are aligned horizontally, they form one circular shape, and the split positions of the sectors are as designated by thick solid lines indicated by numeral 11 in FIG. 6(A).

When the second layer of the rotor core pieces 1a shown in FIG. 6(B) is so arranged in one circular shape that the split position is disposed at the position displaced by ¼ of one sector from the split position 1 of the first layer of the rotor core pieces 1a, the split position of the second sector is disposed at the portion designated by a fine solid line indicated by numeral 12 in FIG. 6(A).

Similarly, when the third and fourth layers of the rotor core pieces 1a are stacked by displacing them by ¼ of one sector from the split position, the split positions of the sectors are disposed at the positions designated by a broken line indicated by numeral 13 and a dotted broken line indicated by numeral 14, respectively.

The conventional rotor core 1 is constructed in the cylindrical structure by sequentially stacking the layers of the rotor core pieces 1a arranged horizontally in one circular shape as described above, providing the ventilation ducts 5 between several layers, and stacking the layers of the rotor core pieces 1a to a predetermined core length.

The rotor core 1 is constructed by stacking the layers of the rotor core pieces 1a, and then integrally clamping the stacked rotor core pieces through the retainers 7 disposed at the upper and lower ends thereof with the clamping bolts.

Since the conventional rotor core is constructed as described above, it is necessary to disassemble the rotor coil and to disassemble all the rotor core pieces after the rotor is assembled and tested for its factory test if the entire rotor cannot be transported as a unit due to limitations in transportation. Thus, it is also needed to reassemble the rotor coil and the rotor core pieces at a site after the disassembled rotor is transported to a place where the rotor is to be installed. Therefore, it takes a long time to disassemble the rotor in the factory, to transport the disassembled rotor and to reassemble the rotor, and there may be a problem in reliability of the performance of the reassembled rotor. It is an object of this invention to overcome this problem.

SUMMARY OF THE INVENTION

The present invention has for its main object to provide a rotor for a rotary electric machine which can eliminate the disassembly of the rotor core pieces of the rotor at the time of transportation and the disassembly of the entire or major part of the rotor coil to facilitate the detachment and attachment of the rotor core from the spider boss or the rotor rim.

The rotor for a rotary electric machine according to the present invention is constructed of a plurality of split sectors composed by dividing its rotor core into a plurality of split sectors divided circumferentially from the rotor core, wherein the split sectors are detachably coupled to a spider boss coupled to a main shaft by means of a tail-shaped joint.

The rotor core of the rotor according to the present invention can be disassembled and assembled at each split sector, and the rotor core can be disassembled and assembled in the state that the entire or major part of the rotor coils remain inserted in the split sectors.

BRIEF DESCRIPTION OF THE DRAWINGS

In the drawings, the same symbols indicate the same or corresponding parts.

DESCRIPTION OF THE PREFERRED EMBODIMENTS

An embodiment of a rotor for a rotary electric machine according to the present invention will be described below in conjunction with the drawings.

Figure 4:
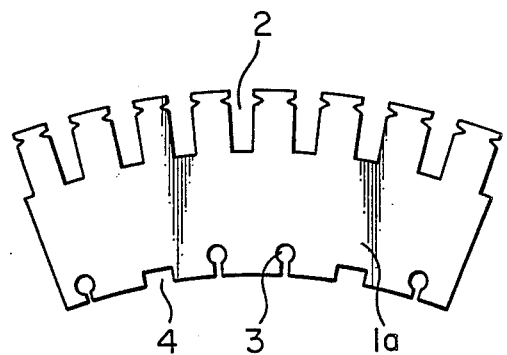
FIG. 4 is a view of a conventional punched rotor core piece.
Figure 5:
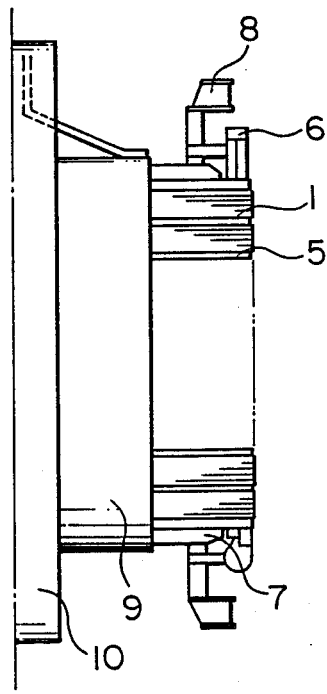
FIG. 5 is a sectional view showing the structure of the rotor core composed of the rotor core piece in FIG. 5.
Figure 6A:
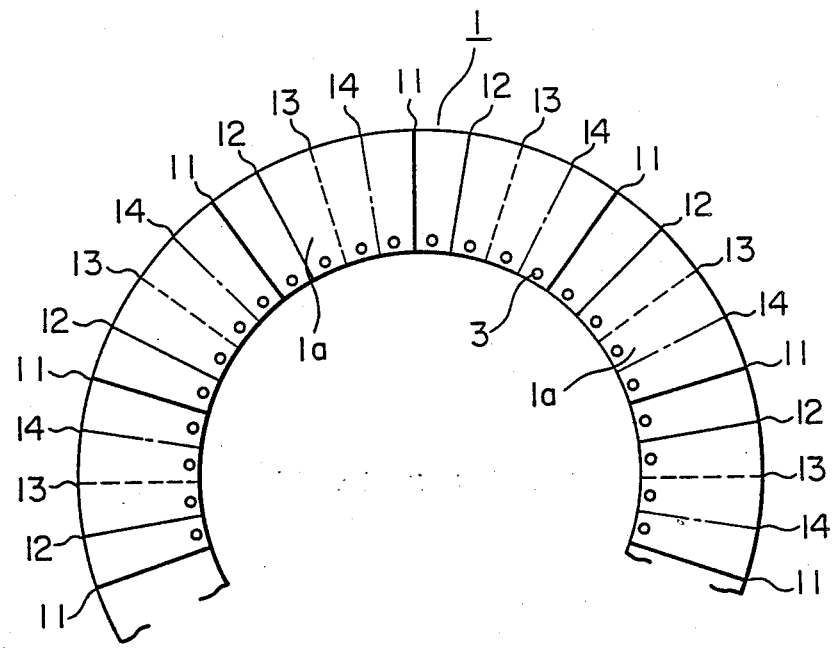
FIG. 6(A) is a partial plan view showing the construction of one layer of the rotor core pieces aligned horizontally in one circular shape.
Figure 6B:
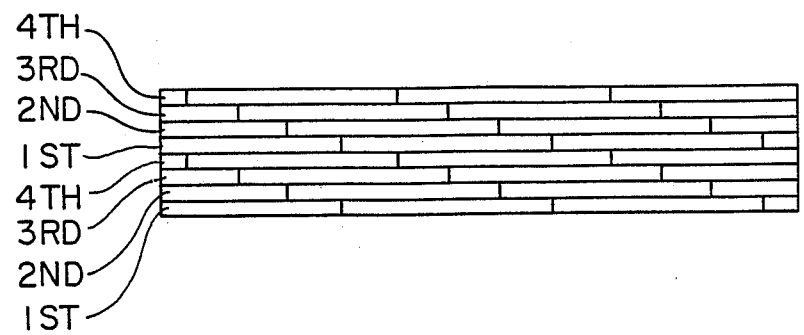
FIG. 6(B) is a partial side view of FIG. 6(A).

In the drawings, reference numerals 2, 3, 5, 6 and 9 denote the same or equivalent components as those in the conventional rotor shown in FIGS. 4 and 5.

Figure 1:
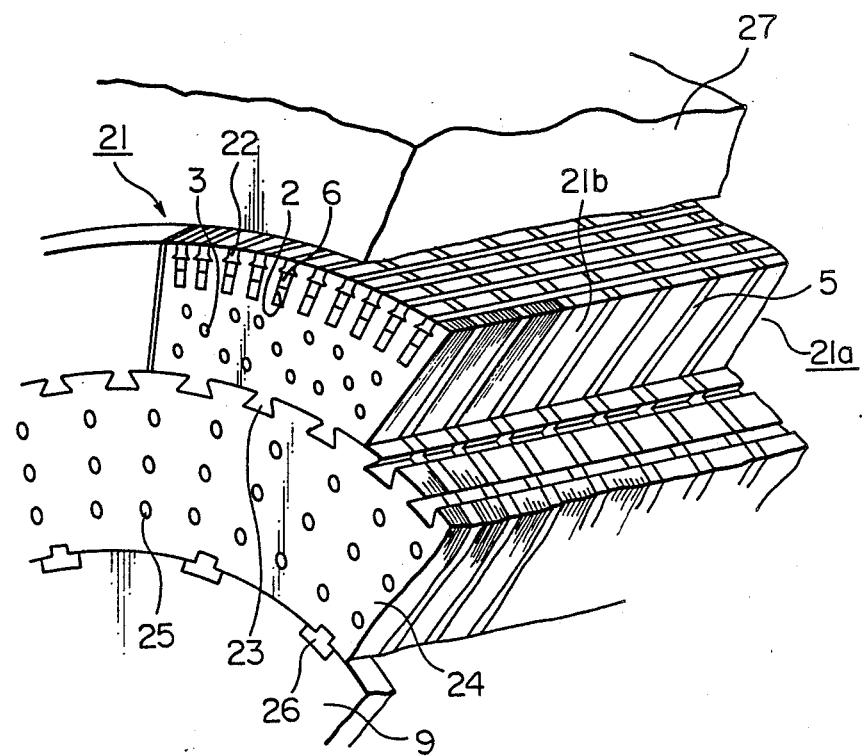
FIG. 1 is a perspective view showing the construction of split sector type rotor cores and rotor rims according to an embodiment of the present invention.

In FIG. 1, reference numeral 21 denotes a rotor core composed by arranging a plurality of split sectors 21a in a circular shape composed by dividing a circle into a plurality in a circumferential direction. Each split sector 21 is composed of a laminate formed by laminating sector-shaped split sector plates 21b punched and shaped from a thin silicon steel plate. Numeral 22 denotes wedges inserted into the slots 2 of the rotor core 21 similarly to those of the conventional rotor for fixing a rotor coil 6 inserted into the slots 2, numeral 23 denotes dovetails of tail-shaped joints for clamping the rotor core 21 to rotor rims 24, and numeral 25 denotes clamping bolt holes through which clamping bolts are penetrated. Numeral 26 denotes keys for coupling the rotor rims 24 to the spider boss 9, and numeral 27 denotes a stator provided through an air gap oppositely to the rotor core 21.

Figure 2:
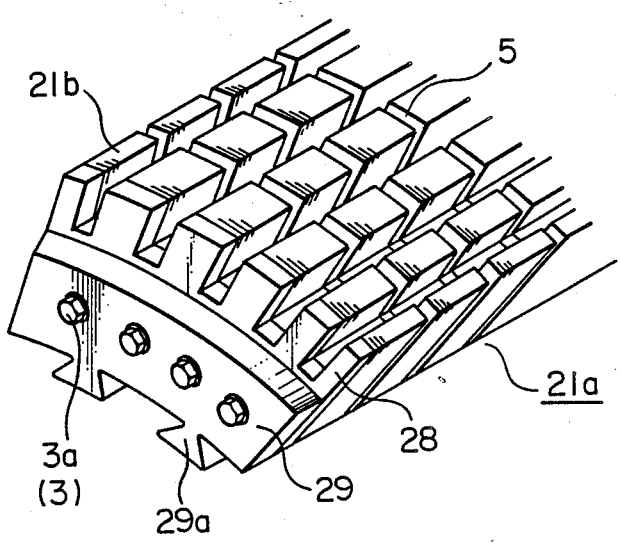
FIG. 2 is a perspective view showing part of one subassembly of the split sector of the rotor core of FIG. 1.

FIG. 2 shows one set of split sector 21a of the rotor core 21 shown in FIG. 1. In FIG. 2, numeral 28 denotes finger plates for reinforcing the split sector plate 21b at the end of the laminate of the split sector plates 21b of the split sector 21a, and the both sides of the finger plates 28 are clamped fixedly by clamping bolts 3a penetrated through the clamping bolt holes 3 by retainers 29 disposed at both sides of the finger plates 28 for clamping the rotor core. Dovetails 29a formed similarly to those of the rotor core 21 are formed at the radial inside of the retainer 29 for clamping the rotor core.

Then, the assembling procedure of the rotor of this embodiment will be described.

As shown in FIG. 1, the rotor core 21 is divided into suitable number of spit sectors 21a of the segment of the suitable number to satisfy the restriction in its transportation in the state that the rotor coil 6 is inserted thereinto.

The laminating work of the split sectors 21a of the core is conducted by laminating the split sector pieces 21b up to the predetermined height of the core while providing predetermined radial ventilation ducts 5, and clamping both the upper and lower ends of the laminated split sector pieces 21b through the finger plates 28 and the retainers 29 for clamping the rotor core by means of the clamping bolts 3a under a predetermined surface pressure to form one block. The one block composed of this single unit becomes one set of the split sector 21a shown in FIG. 2.

The split sectors 21a thus constructed are disposed on the outer periphery of the rotor rims 24 shown in FIG. 1, and coupled fixedly by means of the dovetails 23 formed on the inner peripheries of the split sector pieces 21b so that the entirety forms one circular shape.

Figure 3:
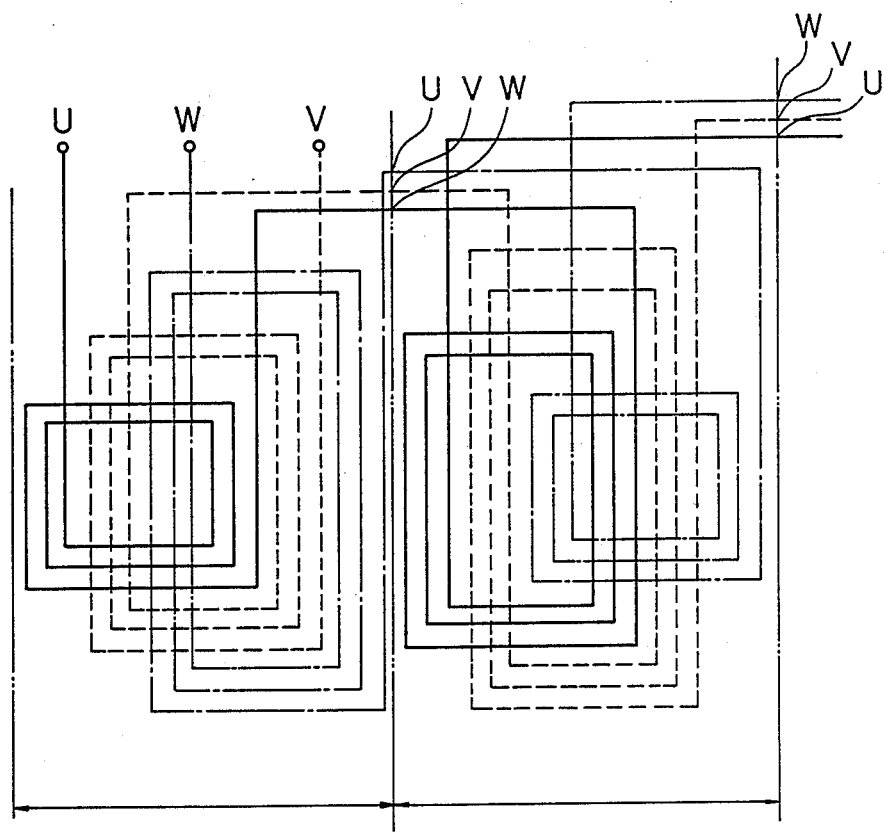
FIG. 3 is a circuit diagram of the rotor coil of FIG. 1.

After the split sectors 21a are thus coupled fixedly with the rotor rims 24 to be assembled as the rotor core 21, the rotor coil 6 is wound according to a predetermined winding type at each split sector, the coil windings of the respective split sectors are connected (in phases U, V and W in case of 3-phase) outside the sides of the split sectors as designated, for example, in the circuit diagram of FIG. 3, i.e., inserted into the slots 2 formed on the outer periphery of the rotor core 21, the wedges 22 are then inserted to the outer peripheral sides of the slots 2 to fix the rotor coil 6 to the rotor core 21, and the ends of the rotor coil 6 are wired.

Then, when it is necessary to disassemble the rotor core 21 for its transportation, the split sectors 21a are separated through the dovetails 23 at each split sector unit to separate the split sectors 21a from the rotor rims 24. Therefore, the entire rotor core 21 is not necessarily fully disassembled.

In the embodiment described above, the rotor in which the rotor core 21 is coupled to the rotor rims 24 has been illustrated. However, the present invention is not limited to the particular embodiment. For example, the rotor core 21 may be connected to the spider boss 9.

In the embodiment described above, the dovetail structure is illustrated as the tail-shaped joint of the rotor core 21. However, the present invention is not limited to the particular embodiment. For example, the dovetail structure may employ a T-shaped tail structure. In this case, similar advantages as those of the above embodiment can be performed.

According to the present invention as described above, the rotor for the rotary electric machine is constructed by circumferentially dividing the rotor core into a plurality of split sectors, composing each split sector of a laminate formed by laminating the split sector pieces, and detachably coupling the split sectors to a rotor clamping tool, i.e., the rotor rims or the spider boss by the joint provided at the lower ends of the split sectors. Therefore, the disassembling and the reassembling of the rotor does not require the full disassembling and full reassembling of the rotor core pieces. Thus, as compared with the conventional rotor, the disassembling and reassembling times of the rotor can be largely reduced. Further, it is not necessary to disassemble the total number of major parts of the rotor coils at the time of disassembling the rotor core. Therefore, the reliability of the rotor for the rotary electric machine can be ensured where assembling and disassembling of the rotor is carried out.

We claim:

1. A rotor for a rotary electric machine comprising:
   a rotor shaft;
   a clamping base fixed to said rotor shaft;
   a circumferentially continuous cylindrical rotor core having axially spaced ends coupled to said clamping base and comprising a plurality of split sectors obtained by circumferentially dividing the rotor core, each split sector being removably attached by at least one joint to the clamping tool and being composed of a laminate of split sector pieces made of sector-shaped thin steel plates, each of said sectors being provided with coil slots at predetermined intervals on the outer periphery of the rotor core; and
   at least one rotor coil inserted into each said coil slot at a predetermined pitch, the rotor coils in each split sector being connected to provide coil windings, the coil windings of each sector being separably connected at said axially spaced ends to coil windings of other split sectors so that each split sector can be separated from the clamping base without removing the coil windings from the coil slots located on said split sector.

2. A rotor for a rotary electric machine according to claim 1, wherein the joint of the lower end of said split sector is formed in a dovetail shape.

3. A rotor for a rotary electric machine according to claim 1, wherein the joint of the lower end of said split sector is formed in a T shape.

4. A rotor for a rotary electric machine according to claim 1, wherein the clamping tool of said rotor shaft is a rotor rim.

5. A rotor for a rotary electric machine according to claim 1, wherein the clamping tool of said rotor shaft is a spider boss.

* * * * *